United States Patent [19]

Störzinger et al.

[11] 4,158,369
[45] Jun. 19, 1979

[54] HOLD-BACK VALVE FOR SINGLE RELEASE AIR BRAKES

[75] Inventors: Thomas Störzinger, Munich; Erich Langer, Puchheim; Peter Pick, Munich, all of Fed. Rep. of Germany

[73] Assignee: Knorr-Bremse GmbH, Munich, Fed. Rep. of Germany

[21] Appl. No.: 828,042

[22] Filed: Aug. 26, 1977

[30] Foreign Application Priority Data

May 12, 1977 [DE] Fed. Rep. of Germany ....... 2721331

[51] Int. Cl.$^2$ .................................................. F16K 3/22
[52] U.S. Cl. ............................ 137/599.2; 137/625.32; 251/315; 303/79
[58] Field of Search ................... 137/599.2, 625.32; 251/315; 303/79

[56] References Cited

U.S. PATENT DOCUMENTS

| 3,064,937 | 11/1962 | Pryor | 251/315 X |
| 3,173,648 | 3/1965 | McGuire | 251/315 X |
| 3,794,071 | 2/1974 | Scott | 137/599.2 |

*Primary Examiner*—Robert G. Nilson
*Attorney, Agent, or Firm*—Edmund M. Jaskiewicz

[57] ABSTRACT

A hold-back valve for single release air brakes includes a plug valve member in a chamber of a valve body and rotatable between at least two positions to establish paths of different resistance to flow between air inlet and outlet passages in the valve body. The plug has spherical central portion with a flattened surface and the spherical central portion is sealingly engageable with one end of a hollow cylindrical flexible packing surrounding the opening of the air inlet passage to the chamber in the valve body. The rotatable plug has passages therethrough to define two or three different flow paths when particular passages of the plug are connected between the air inlet and outlet of the valve body.

30 Claims, 7 Drawing Figures

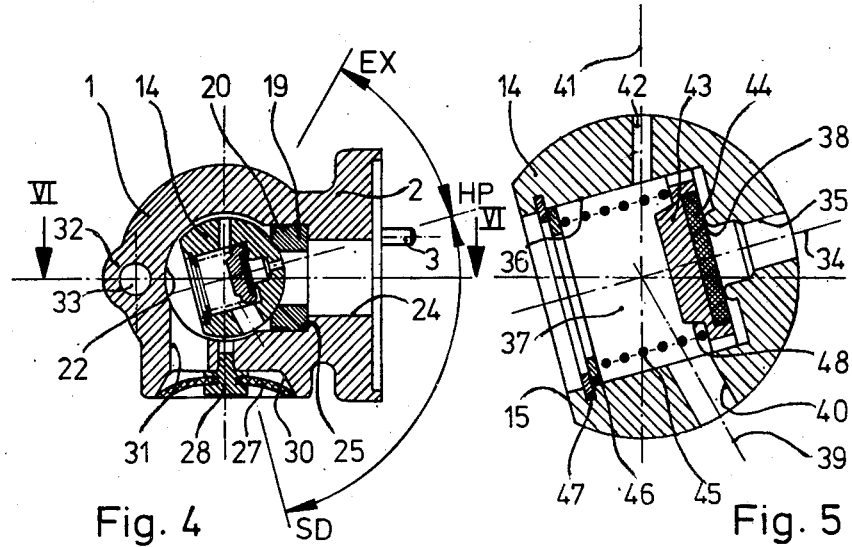
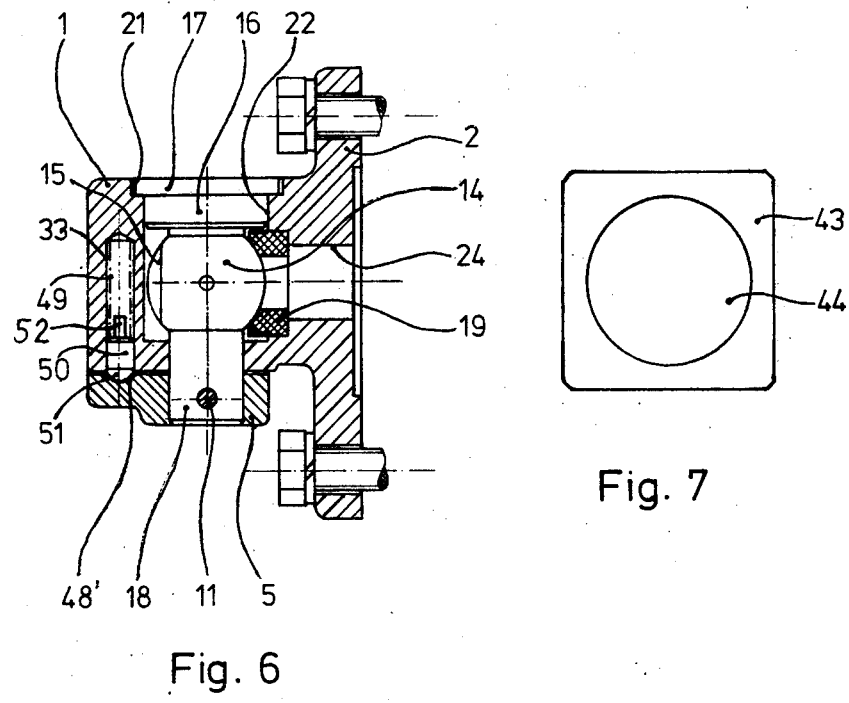

HOLD-BACK VALVE FOR SINGLE RELEASE AIR BRAKES

The present invention relates to a hold-back valve for single release air brakes having a plug valve member rotatable to at least two positions to establish flow paths between an air inlet and air outlet, more particularly, to the structure of the plug and valve body.

Such hold-back valves have been generally known in the railroad art and particularly from the periodical "Archiv für Eisenbahntechnik" [Archive for Railroad Technology], December 1962, Series 17, p. 95f. Such valves function to prevent a complete release of brakes in a single release air brake system particularly during downhill travel wherein frequent releases of the brakes followed quickly by braking operations would exhaust the air supply. Prior to the railway vehicles proceeding downhill, the valves are manually adjusted to various pressure hold-back stages (high-pressure, or to a slow exhaust,) depending upon the load of the vehicles constituting the train and the grade of the slope. When this downhill travel has been completed, the valves are returned to a direct exhaust position.

Known forms of such hold-back valves generally comprise a cylindrical or frustoconical shaped valve plug which makes metal-to-metal contact with the wall portions of the valve housing. Accordingly, the valve seats, which must be precisely fitted and assembled, are readily susceptible and sensitive to damage and require relatively high maintenance expenses. Should for any reason lubrication of the valves become defective, the valves very quickly become inoperative. Such known hold-back valves had the further disadvantage that they required a large number of components which in turn resulted in high assembly costs. Such hold-back valves also had a housing of a relatively complex shape so that relatively high manufacturing expenses were incurred for casting of the housing.

It is therefore the principal object of the present invention to provide an improved hold-back valve for single release air brakes of the type as described herein.

It is another object of the present invention to provide such a hold-back valve requiring a small number of movable components so as to facilitate assembly, requires very little maintenance and is capable of long and reliable operation even under poor lubricating conditions.

It is an additional object of the present invention to provide such a hold-back valve having effective sealing which will not be adversely affected by soiling, minor damage or dirt upon the sealing surfaces.

It is a further object of the present invention to provide such a hold-back valve which has a valve housing of a relatively simple shape so that the housing can be readily produced as a casting.

It is still another object of the present invention to provide such a hold-back valve which can be adapted to function as a two-stage or three-stage valve utilizing the same valve housing.

According to one aspect of the present invention a hold-back valve for single release air brakes may comprise a valve body having air inlet and outlet passages therein opening to a chamber within the valve body. A plug valve member in the chamber of the valve body is rotatable between at least two positions and is provided with passage means therein so as to define paths of different resistance to flow between the inlet and outlet. The plug has a spherically shaped central portion having a flattened surface. A hollow cylindrical flexible packing is positioned around the opening of the air inlet passage to the chamber. One end of the packing which faces toward the spherical central portion of the plug is shaped to conform to the spherical surface.

Other objects and advantages of the present invention will be apparent upon reference to the accompanying description when taken in conjunction with the following drawings, which are exemplary, wherein;

FIG. 4 is a view similar to that of FIG. 3 but showing a three-stage hold-back valve according to the present invention;

FIG. 5 is a view in enlarged scale of the plug in the valve of FIG. 4;

FIG. 6 is a sectional view taken along the line VI—VI of FIG. 4; and

FIG. 7 is a plan view of a valve member of the check valve best illustrated in FIG. 5.

Proceeding next to the drawings wherein like reference symbols indicate the same parts throughout the various views a specific embodiment and modifications of the present invention will be described in detail.

Figure 1:
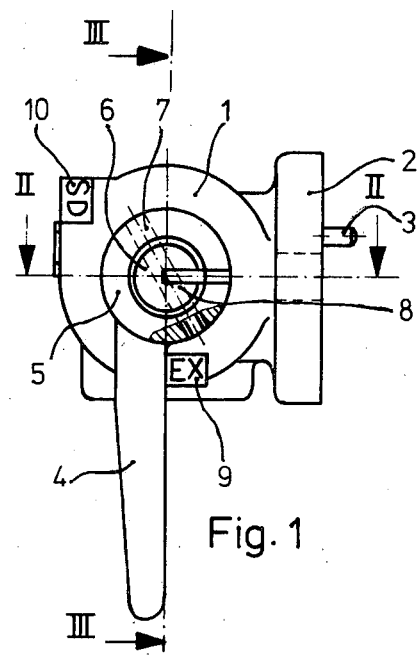
FIG. 1 is an elevational view of an two-stage hold-back valve according to the present invention.

In FIG. 1 there is illustrated a two-stage hold-back valve according to the present invention and comprising a valve body or housing 1 opening to a flange 2 which is provided with a centering pin 3 and mounting holes 12. Within the valve body is a cylindrical chamber 22 one end of which opens to a surface of the housing at 21 which opening is a larger diameter than the cylindrical chamber 22. An air inlet passage 24 extends from chamber 22 to open at the flange 2.

Figure 2:
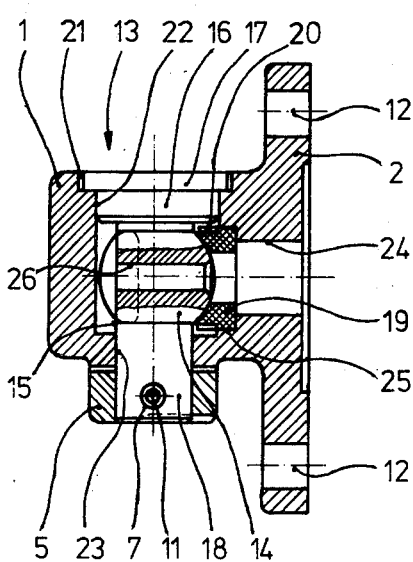
FIG. 2 is a sectional view taken along the line II—II of FIG. 1.

Rotatably positioned within the chamber 22 is a plug valve member 13 having a central portion 14 which has a spherical shape a portion of which is removed to define a flattened surface 15 which is at an angle of about 80° with a central bore 26 of relatively large cross-section having a widened opening 26' opposite from flattened surface 15. Extending upwardly from the spherical central portion 14 as viewed in FIG. 2 is a cylindrical extension 16 whose diameter is somewhat larger than that of the central portion 14. On the end of upper extension 16 is an external flange or projecting edge 17.

The other side of the central portion 14 has a lower cylindrical extension 18 whose diameter is smaller than that of the central portion 14. The lower extension 18 has a bore 7 therethrough which together with a bore 8 on an annular member 5 receives a clamping pin or sleeve 11. A handle 4 extends from the annular member 5 and thus the handle assembly 4,5 is attached to the plug by the clamping sleeve 11. The handle 4 is pivoted betweeen stops 9 and 10 formed on the exterior surface of the housing 1.

The end of air inlet 24 opening into the chamber 22 has a larger diameter 25 in which is inserted a hollow cylindrical flexible packing 19 one end of which is shaped to conform to the cylindrical shape of the plug central portion 14 so as to sealingly engage the spherical central portion. The periphery of the end of packing 19 facing toward the plug the packing is enclosed by a firm and rigid ring or annular member 20 so as to impart greater stability to the packing.

Coaxial to the cylindrical chamber 22 there is a lower cylindrical opening 23 which defines a bearing surface for the lower cylindrical extension 18. The air inlet 24 is perpendicular to the central longitudinal axis of the cylindrical chamber 22.

Within the plug central portion 14 and perpendicular to the bore 26 there is a bore 26" extending to the outer surface of the plug and the inner end of bore 26" opening to the bore 26 is provided with a constriction or throttle opening 26'" for the purpose of throttling air passing therethrough.

Extending from chamber 22 is an air outlet 31 which is perpendicular to the air inlet 24 and which opens to the exterior of the housing 1 with a widened opening having an inclined surface 30. The air outlet 31 is protected by an outlet diaphragm 27 the center portion of which is attached to a holding element 28 which may be in the form of a pin and is press-fitted in a bore 29 formed in the valve housing. The bore 29 may be blind. The peripheral edge of the diaphragm 27 is in contact with the opening inclined surface 30.

The cylindrical chamber 22 which opens to the surface of the valve housing also functions as an assembly opening and for assembly of the valve the packing 19 is first introduced through the assembly opening 22 and is fixed laterally in the seat 25 of the air inlet 24. The plug 13 is then inserted through the assembly opening 22 and is rotatably positioned so that the flattened surface 15 is directed away from the packing 19. The plug 13 is then inserted inwardly until the flange 17 abuts against the shoulder formed by the large diameter opening 21. Upper and lower extensions 16 and 18 of the plug are now rotatably mounted in assembly opening 22 and the lower opening 23 respectively. The plug is fixed against movement in its axial direction with respect to the valve body by assembly of the annular member 5 of the handle 4 over the projecting portion of the lower cylindrical extension 18 and the annular member is then secured by the clamping sleeve. The plug 13 is thus retained against axial movement by the flange 17 on one end and the annular member 5 of the handle on the other end. In order to compensate for any axial play of the plug because of any play or clearance between annular member 5 and the opposing surface of valve body 1 as can be seen in FIG. 2, the plug is self-centering by the interengagement of its spherical central portion 14 and the shaped inner end of the packing 19.

When the plug 13 is in the direct venting or exahust position, the axis of the large cross-section bore 26 is aligned with the axis of air inlet 24. In the throttled air position of the plug 13 small diameter bore 26" will be aligned with the axis of the air inlet 24.

Figure 3:
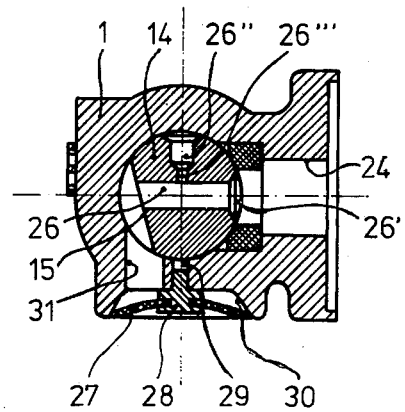
FIG. 3 is a sectional view taken along the line III—III of FIG. 1.

In FIG. 3 the plug 13 is shown in the direct exhaust position. Air thus flows into the valve through air inlet 24 and bore 26 to the air outlet 31 and then outwardly to the atmosphere around the edges of the flexible diaphragm 27.

In the throttled air position, the plug is pivoted 90° clockwise in the plane of the drawing of FIG. 3 such that air flows in through air inlet 24, through bore 26", throttle opening 26'" and bore 26 to the air outlet 31. The widened opening 26' of the bore 26 faces at least partially air outlet 31 in order to provide for a largely unobstructed exhausting of the air.

In FIGS. 4-7 there is illustrated a three-stage hold-back valve according to the present invention. In FIG. 4 it can be seen that air outlet 31 which communicates with the chamber of assembly opening 22 has its axis perpendicular to the axes of the air inlet 24 and the chamber 22. The valve housing 1 is provided with a thickened or enlarged portion 32 in which is formed a bore 33 to receive a locking pin 50 loaded by a spring 49 positioned upon a centering post 52 on the inner end of pin 50. The outer end of pin 50 indicated at 51 is semispherical and is directed toward the annular member 5 of the handle to be engageable with an arcuate groove 48' formed in the inner surface of annular member 5. The groove 48' is provided with a plurality of recesses to receive pin 50 so as to position the handle and, accordingly, the plug 13 in predetermined selected positions. Except for the plug structure, which will be described in detail, the hold-back valve of FIGS. 4-7 is substantially similar to the valve of FIGS. 1-3.

The central portion 14 of a plug for a three-stage hold-back valve is shown in greater detail in FIG. 5 and extending perpendicularly from the flattened surface 15 there is a transversely extending axis 34 which defines the axis of an opening 35. Opposite opening 35 is a larger diameter opening 36 which opens into the flattened surface 15 and which defines a valve chamber 37. The opening 35 opens into the valve chamber 37 and there is a valve seat 38 surrounding opening 35 within the chamber 37. The diameter of the opening 35 is small with respect to the opening 36.

At an angle of about 80° to the axis 34 there is defined a second axis 39 which is the central longitudinal axis of a third opening 40 which also opens into the valve chamber 37. At an angle of about 65° on the other side of the axis 34 there is an axis 41 which defines the central longitudinal axis of an opening 42 which similarly opens into the valve chamber 37. The angles are measured in both directions from the axis 34 passing through the opening 35. The axes 34, 39 and 41 intersect each other in the geometrical center of the spherical central portion 14 of the plug.

In the valve chamber 37 there is a flat valve member 43 which has a square or rectangular cross-section as shown in FIG. 7. On the side of the valve member 43 facing valve seat 38 there is a centrally located recess in which is seated a disc-shaped flexible packing 44 of a flexible material, such as rubber. The valve member 43 is urged against the valve seat 38 by a spring 45 one end of which is supported upon an annular member 46 secured by a locking ring 47 in an annular groove of the valve chamber 37. The other end of spring 45 is centered upon a surface of the valve member 43 by a centering projection 48.

The square shape of valve member 43 as shown in FIG. 7 provides for the unobstructed flow of air around the outer edges of the valve member and into the valve chamber 37. It is to be understood that other shapes of the valve member 43 can be used which will perform in such a manner.

In FIG. 4, the plug is shown in the high hold-back pressure position in which air passes through air inlet 24 and opening 35 against the force of the spring 45 to the second opening 36 and from there to air outlet 31. The hold-back pressure can be precisely determined by the initial tension of the spring 45. For adjustment of this pressure, an adjusting nut may be provided in place of the locking ring 47 and threaded into internal threads formed in the opening 36 so that threading of the adjusting nut will determine the force exerted by the spring and thus the hold-back pressure.

The plug is switched to the direct exhaust position by pivoting the handle through an angle of about 45° to position EX. Opening 30, which is of a sufficiently large diameter for non-throttled passage of air therethrough, then flows air into the chamber 37 and from the opening 36.

For the slow exhaust position the plug is pivoted in a corresponding manner from the central position shown in FIG. 4 by about 90° to the position indicated SD so that air flows through opening 42 to the opening 40. The diameter of opening 42 is such that air can flow out only under throttled conditions and at a slower rate of flow. The throttling affect is determined substantially by the diameter of the opening 42.

It is apparent that various other arrangements of bores and ducts in the plug can be employed, other than those illustrated and described above. Suitable bores and passages can be used to provide a hold-back valve having four positions. The various ducts and passages can be positioned so that other pivoting angles of the handle can be employed in order to switch between the different positions of the valve.

It will be understood that this invention is susceptible to modification in order to adapt it to different usages and conditions, and accordingly, it is desired to comprehend such modifications within this invention as may fall within the scope of the appended claims.

What is claimed is:

1. A hold-back valve for single release air brakes comprising a valve body having a chamber therein and air inlet and air outlet passages opening to said chamber, a plug valve member having passage means therethrough disposed in said chamber and rotatable between at least two positions to define paths of different resistance to flow between said air inlet and outlet, said plug having a central portion shaped as a sphere having a flattened surface, and a hollow cylindrical flexible packing around the opening of said air inlet passage to said chamber, said packing having one end facing toward said plug central portion and said one end shaped to conform to the spherical surface thereof, said plug valve member comprising first and second cylindrical extensions on said central portion, said first extension having a larger diameter than said second extension and the diameter of said second extension being smaller than that of said central portion, and means on the end of said first extension for defining an external flange thereon.

2. A hold-back valve as claimed in claim 1 wherein said chamber has a diameter defining a bearing surface for said first extension, said chamber having first and second openings to the exterior of said valve body, said first opening receiving said first extension external flange means and said second opening defining a bearing surface for said second extension.

3. A hold-back valve as claimed in claim 2 wherein said second extension projects outwardly of said valve body, a handle having an annular member fastened to said second extension projection, said annular member and said external flange means limiting axial movement of said plug with respect to said valve body.

4. A hold-back valve as claimed in claim 3 and further comprising a spring-loaded pin in a bore in said valve body engageable with recesses in a groove in said handle annular member to lock said handle in position.

5. A hold-back valve as claimed in claim 4 wherein said plug valve member is rotatable between three positions and said passage means define a direct exhaust path, a slow exhaust path and a high-pressure hold-back path, said recesses so spaced that said plug is pivotable between two end positions defining slow exhaust and direct exhaust paths respectively, there being a further recess to lock said plug in a central position.

6. A hold-back valve as claimed in claim 1 wherein said one end of said cylindrical packing and said spherical central portion of said plug are engageable such that said plug is centered within said valve body.

7. A hold-back valve as claimed in claim 1 wherein said air inlet and outlet define an angle of substantially 90° with each other, said plug member passage means comprises a first through-bore for the non-throttled passage of air therethrough and a second bore at substantially 90° from said first bore extending from the interior of said first bore for the throttled passage of air therethrough.

8. A hold-back valve as claimed in claim 1 and a diaphragm positioned over the end of said air outlet passage opening to the exterior of said valve body.

9. A hold-back valve as claimed in claim 8 and a holding element attached to the central portion of said diaphragm and mounted in a bore in said valve body.

10. A hold-back valve as claimed in claim 8 wherein said exterior air outlet opening is outwardly inclined and the edge of said diaphragm engages said inclined opening.

11. A hold-back valve as claimed in claim 1 wherein said plug valve member is rotatable between three positions and said passage means define a direct exhaust path, a slow exhaust path and a high-pressure hold-back path.

12. A hold-back valve as claimed in claim 11 and a spring-loaded check valve within said plug passage means.

13. A hold-back valve as claimed in claim 12 wherein said spring-loaded check valve comprises an adjustable spring such that the hold-back pressure can be selectively adjusted.

14. A hold-back valve as claimed in claim 12 wherein said passage means comprises a large diameter third bore extending perpendicularly to said plug flattened surface and having a third opening on said flattened surface, said check valve being disposed within said third bore.

15. A hold-back valve as claimed in claim 14 and a flat annular member retained in said third bore by a lock ring and a spring being supported against said flat annular member.

16. A hold-back valve as claimed in claim 15 wherein there is a fourth opening in said plug between said third bore and the surface of said plug opposite from said flattened surface, a valve seat in said third bore surrounding said fourth opening, said check valve having a flat valve member with a flexible packing on one side thereof engageable with said valve seat under the action of said spring.

17. A hold-back valve as claimed in claim 16 and means projecting on the other side of said flat valve member for centering said spring.

18. A hold-back valve as claimed in claim 16 wherein said flat valve member is substntially square.

19. A hold-back valve as claimed in claim 16 wherein said plug member passage means further has fifth and sixth openings to the surface of the plug member.

20. A hold-back valve as claimed in claim 19 wherein said fourth opening, said check valve and said third opening define a high hold-back pressure path.

21. A hold-back valve as claimed in claim 19 wherein said fifth opening and said third opening define a direct exhaust path.

22. A hold-back valve as claimed in claim 19 wherein said sixth opening and said fifth opening define a slow exhaust path.

23. A hold-back valve as claimed in claim 19 wherein the axis of said fifth opening defines an angle of about 65° with the axis of said fourth opening.

24. A hold-back valve as claimed in claim 19 wherein the axis of said sixth opening defines an angle of about 80° with the axis of said fourth opening.

25. A hold-back valve as claimed in claim 19 wherein the axes of said third, fourth, fifth and sixth openings intersect at the geometrical center of said spherical central portion of the plug.

26. A hold-back valve as claimed in claim 19 wherein the diameters of said fifth and third openings are substantially large with respect to the diameters of said fourth and sixth openings.

27. A hold-back valve as claimed in claim 19 wherein the diameters of said fourth and sixth openings are substantially equal.

28. A hold-back valve as claimed in claim 16 wherein said third and fourth openings are aligned along a common axis.

29. A hold-back valve as claimed in claim 11 wherein said plug is turned through an angle of 45° from said slow exhaust path to said high-pressure hold-back path and is turned through an angle of 90° from said high-pressure hold-back path to said direct exhaust path.

30. A hold-back valve as claimed in claim 1 and a ring of rigid material enclosing the peripheral portion of said one end of said cylindrical packing.

* * * * *